(12) United States Patent
Simpson et al.

(10) Patent No.: US 8,370,504 B2
(45) Date of Patent: Feb. 5, 2013

(54) METHOD AND SYSTEM FOR PREDICTING DOMAIN NAME REGISTRATION RENEWAL PROBABILITY

(75) Inventors: Andrew W. Simpson, Sterling, VA (US); Alexander D. Holmes, Sterling, VA (US); Karthik Shyamsunder, Winchester, VA (US); Srinivas Sunkara, Ashburn, VA (US); Leonard Orentas, South Riding, VA (US)

(73) Assignee: Verisign, Inc., Dulles, VA (US)

( * ) Notice: Subject to any disclaimer, the term of this patent is extended or adjusted under 35 U.S.C. 154(b) by 618 days.

(21) Appl. No.: 12/503,811

(22) Filed: Jul. 15, 2009

(65) Prior Publication Data

US 2011/0016217 A1 Jan. 20, 2011

(51) Int. Cl.
*G06F 15/16* (2006.01)
(52) U.S. Cl. .......................... 709/228; 709/245; 707/692
(58) Field of Classification Search .................... 709/228
See application file for complete search history.

(56) References Cited

U.S. PATENT DOCUMENTS

| | | | |
|---|---|---|---|
| 6,233,575 B1 | 5/2001 | Agrawal et al. | |
| 8,219,533 B2 * | 7/2012 | Bennett | 707/692 |
| 2002/0032772 A1 | 3/2002 | Oldtad et al. | |
| 2003/0004744 A1 | 1/2003 | Greene et al. | |
| 2004/0111438 A1 | 6/2004 | Chitrapura et al. | |
| 2007/0073758 A1 | 3/2007 | Perry et al. | |
| 2007/0214284 A1 * | 9/2007 | King et al. | 709/245 |
| 2007/0299967 A1 | 12/2007 | Brady | |
| 2009/0210417 A1 * | 8/2009 | Bennett | 707/5 |
| 2009/0297527 A1 * | 12/2009 | Muller et al. | 424/139.1 |
| 2011/0016217 A1 * | 1/2011 | Simpson et al. | 709/228 |

OTHER PUBLICATIONS

International Search Report and Written Opinion of PCT Application No. PCT/US2010/041849, mailed Sep. 2, 2010, 9 pages total.

U.S. Appl. No. 12/428,208, filed Apr. 22, 2009, first named inventor: Leonard Linas Orentas.

* cited by examiner

*Primary Examiner* — Hua Fan
(74) *Attorney, Agent, or Firm* — MH2 Technology Law Group, LLP

(57) ABSTRACT

A method for determining probability of a domain name registration renewal includes receiving a plurality of inputs associated with the domain name and assigning each of the plurality of inputs to at least one category from among a plurality of categories. The method also includes assigning a weighted value to each of the plurality of categories and calculating the probability of the domain name registration renewal based in part on the weighted value of each category.

24 Claims, 7 Drawing Sheets

| June '10 | | | | |
|---|---|---|---|---|
| Domain Name | Registration Expiration date | Renewal Probability | Renewal Fee | Expected Revenue |
| example1.com | 6/1/2010 | 80% | $50 | $40 |
| example2.com | 6/3/2010 | 55% | $50 | $28 |
| example3.com | 6/6/2010 | 67% | $50 | $34 |
| example4.com | 6/15/2010 | 35% | $50 | $18 |
| ⋮ | ⋮ | ⋮ | ⋮ | ⋮ |
| exampleN.com | 6/30/2009 | 74% | $50 | $37 |
| | | | | $54,675 |

FIG. 7

METHOD AND SYSTEM FOR PREDICTING DOMAIN NAME REGISTRATION RENEWAL PROBABILITY

BACKGROUND

The internet has grown exponentially in the last decade. In addition to being used as an information resource, the internet plays a major role in facilitating growth of commerce. Each year billions of dollars of merchandise and other articles are bought and sold via the internet. In addition, many business and other institutions use the internet to interact with their customers. As a result, there has been an explosion in the number of websites that are associated with some form of business activity. Each website can be linked to a domain name, e.g., the website "www.example.com" can be associated with the example.com domain. A domain name is a primary vehicle to establish an on-line presence on the internet and is used to identify computer systems on the internet. As the number of websites has increased, so has the demand for domain names. Domain names are usually leased by paying an annual subscription fee.

The Domain Name System (DNS) is the part of the Internet infrastructure that translates human-readable domain names into the Internet Protocol (IP) numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g. the "example" level in "www.example.com". Each second-level domain can include a number of third-level domains located immediately to the left of the second-level domain, e.g. the "www" level in "www.example.com".

There can be additional level domains as well, with virtually no limitation. For example, a domain with additional domain levels could be "www.photos.example.com". It should also be noted that a single IP address, e.g. a single server, can support numerous domain names. That is, different domain names may resolve to the same server, that can then determine what content to provide based on the requested domain name and/or additional non-domain information. This is sometimes referred to as virtual hosting.

The responsibility for operating each TLD (including maintaining a registry of the second-level domains within the TLD) is delegated to a particular organization, known as a domain name registry ("registry"). The registry is primarily responsible for answering queries for IP addresses associated with domains ("resolving"), typically through DNS servers that maintain such information in large databases, and operating its top-level domain.

Each domain name can be registered with a registry that provides the basic DNS resolution for that domain name. For example, VeriSign Inc. is the current domain name registry for the ".com" and ".net" domains. Each domain name can be subject to an annual registration fee, as described above. The renewal fee can depend on several factors including the type of domain, the length of its existence, type of website associated with a domain, or any other relevant factor. In some instances, the renewal fee can be fixed per domain category.

SUMMARY

Certain embodiments of the present invention relate to methods for predicting registration renewal probability of a domain name. In some embodiments, the method can include receiving a plurality of attributes associated with a registered domain name; the plurality of attributes providing registration information, hosting details that can include nameserver data, webserver data, and/or mail server data for the domain name, domain lookup statistics for the domain, information about a website hosted at the domain or a combination thereof. After receiving the attributes, each of the plurality of attributes can be assigned to at least one of a plurality of categories, each of the plurality of categories being associated with at least one of the length of time the domain name has been registered, the number of continuous times the domain name registration has been renewed, the length of time the domain has been registered without becoming unregistered, the status of the website hosted at the domain, and the purpose of the website hosted at the domain. Thereafter, a weighted value may be assigned to each of the plurality of categories and a probability that the domain name registration will be renewed can be determined based on the weighted value. After determining the probability, an entity that provides the registration and resolution services for the domain name can determine expected revenue from the registered domain name.

Other embodiments of the present invention can provide a system for calculating the probability of domain name registration renewal. The system can include a receiving unit configured to receive data from multiple sources, a sorting unit configured to organize the received data into one or more categories, an assignment unit configured to assign a weighted value to each of the one or more categories based on one or more criteria, an analyzing unit communicably coupled to the receiving unit, the sorting unit, and the assignment unit and configured to determine a probability of the domain name registration being renewed based at least in part on the weighted values, or combinations thereof.

The following detailed description, together with the accompanying drawings will provide a better understanding of the nature and advantages of the present invention.

BRIEF DESCRIPTION OF THE DRAWINGS

FIG. 7 illustrates a table for displaying expected revenue based on the registration renewal probability of several domains according to an embodiment of the present invention.

DETAILED DESCRIPTION OF SPECIFIC EMBODIMENTS

Websites are created to serve many types of domain purposes. In some instances, not every business-oriented website currently registered generates enough revenue and/or attention to justify renewal of its registration every year. As a result, many websites are shut down each year as the businesses associated with them cease to exist or it becomes economically infeasible for the owner to keep the website operational. Consequently, not every domain name registration is renewed every year. Currently, it is difficult to determine how many of the domain names that are due for renewal, will actually renew their registration in any given month or year. This in turn may impair the ability of an entity, which derives income from the registration renewal fees, to forecast revenue expected from the registration renewals.

Certain embodiments of the present invention relate to methods of determining a probability of renewal of domain name registrations. In some embodiments, the method can include receiving various data attributes associated with a particular domain name. The received data attributes can be organized into one or more categories based on an analysis of the data attributes. Each category may be assigned a weighted value. The weighted values across all categories for a particular domain name may be aggregated to determine an aggregated weighted value for the domain name. The aggregated weighted value of the domain name can be compared with a threshold value to determine whether the owner of that particular domain name is more or less likely to renew its registration. In some embodiments, the calculated probability of registration renewal across multiple domains served by a particular company can be used to forecast expected revenue from the registration activity.

Other embodiments of the present invention relate to a system for determining probability of registration renewal of a domain name. The system can include, a receiving unit configured to receive data from multiple sources, a sorting unit configured to organize the received data into one or more categories, an assignment unit configured to assign a weighted value to each of the one or more categories based on one or more criteria, an analyzing unit communicably coupled to the receiving unit, the sorting unit, and the assignment unit and configured to determine a probability of the domain name registration being renewed based at least in part on the weighted values, or combinations thereof. The system may be further configured to calculate expected revenue from the registration activity across multiple domain names.

Figure 1:
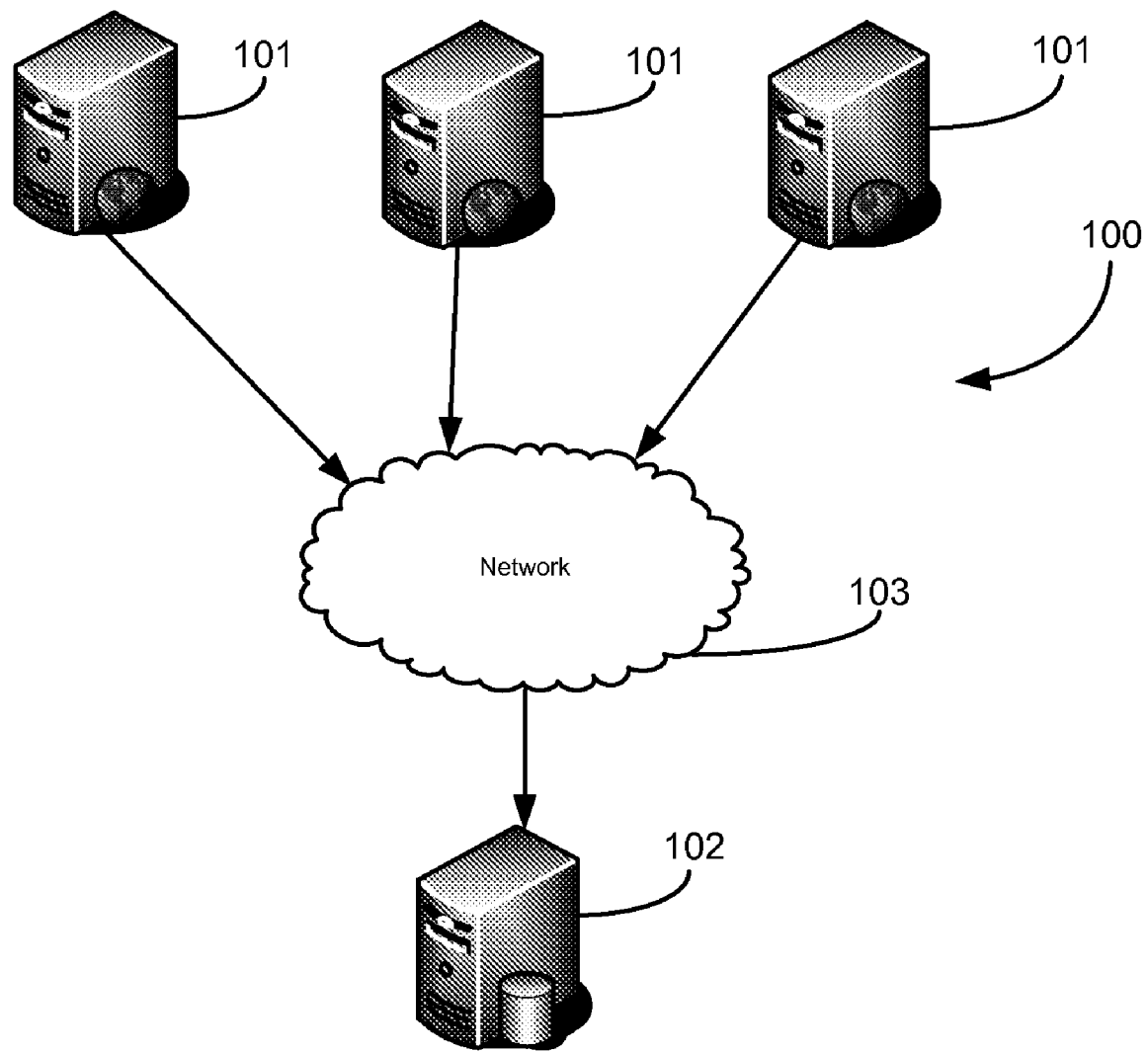
FIG. 1 is a high-level illustration of the various components of a domain name registration system according to an embodiment of the present invention.

FIG. 1 illustrates system 100 representative of a portion of a domain name system (DNS). The illustrated portion may include one or more clients 101 that can communicate with server 102 via a network 103. Server 102 can be hosted by a registry, which can provide domain name provisioning and registration services, domain name resolution services, or assist in gathering data from one or more domains. For example, a potential client can request a particular domain name to be registered in his name by communicating a request to the registry. If the requested domain name is available, the client may be given a choice to reserve the domain name by paying the annual subscription fee to the registry. In some embodiments, a registrar may provide domain name acquisition and registration services to the client instead of the client directly communicating with the registry.

Each client 101 can include information associated with a particular domain name. Server 102 can provide domain name services, e.g., domain name resolution, to client server 101. In addition to providing domain name services, Server 102 can also acquire data related to each domain name that it serves. For example, Server 102 can acquire traffic data associated with client 101 that hosts a particular domain name. In addition, if there is a website associated with a domain name, Server 102 can acquire the following exemplary attributes with respect to the website: Domain Status; Domain Purpose; Domain Categories; Domain Traffic, Domain Key Terms, Domain Property/Features/Function, Domain Content, etc. Methods for determining purpose of a website and deriving attributes/characteristics data about the web site associated with the domain name are disclosed in commonly assigned and co-pending U.S. patent application Ser. No. 12/428,208, filed on Apr. 22, 2009 and entitled "Domain Status, Purpose and Categories" the disclosure of which is incorporated by reference herein for all purposes.

Analyzing historical data of domain names and comparing that to the current behavior of a particular domain name can provide insight into how likely it is that the particular domain name registration will be renewed. For example, if it is known that websites that experience consistent reduction in traffic over a period of time, e.g., six months, have a very low renewal rate, a current website exhibiting similar behavior can be flagged as being at a high risk of non-renewal during its next renewal cycle. This data can be useful, e.g., in proactively addressing the reasons behind the potential non-renewal, thereby increasing the renewal likelihood of the domain name associated with that website.

As described above, data associated with a domain name and/or a website associated with a domain name may be included as part of a profile for the domain name. The data for a particular domain name may be derived from several sources as described below.

Registration data can include data related to the registration of the domain. For example, registration data can include, the date of inception of the domain name, the length of registration of the domain name, the continuity of registration, number of times the domain has changed ownership, etc. This data may be obtained from registration records that may be maintained by the registry and/or the registrar.

Registrar data can include information about the registrar. As described above, a registrar can provide domain name acquisition and registration services, among other services, to their clients. Registrars can be differentiated on the type of clients served, e.g., premium, general, or domainer type of registrar. A premium registrar can be a registrar who provides domain name services to large organizations, both for profit and non-profit. In some instances, the domain names registered by premium registrars can have a high likelihood of renewal compared to domain names registered by other registrars. A general registrar can be a registrar who provides domain name services to smaller organizations, individuals, etc. A domainer registrar may be an entity that can help clients build portfolios of desirable domain names. The clients may register multiple domain names either for reselling or for traffic monetization, e.g., marketable generic dictionary-word domain names or domains whose registrations has lapsed yet still retain reasonable traffic. In addition, the domainer registrars can register domain names with a view of generating revenue by directing traffic to other sites. For example, when a user accesses a traffic monetization type of domain name, the domain name may resolve to a web page containing advertising listings and links. These links may be targeted to the predicted interests of the visitor and may change dynamically based on the results that visitors click on. Usually the domain holder is paid based on how many links have been visited (e.g. pay per click) and on how beneficial those visits have been. There may be an appreciable difference in the domain name profiles for the clients served by the different types of registrars mentioned above.

In some embodiments, it may be possible to create a database of domain names based on the type or name of the registrar that serves the owner of the domain name. The database may additionally include information about the history of renewal rates for domain names initially registered by a particular type of registrar, e.g., premium, and/or the name of the registrar, e.g., XYZ Company. The information in this database can be used in predicting a renewal probability for a domain name, as described more fully throughout the present specification.

Another source of data can be the website associated with a domain name. In some embodiments, data gathered from a website can provide insight into the status of the domain as well as possible future behavior. Website data can include, e.g., whether the website is functional, the purpose of the website, the content of the website, frequency of content update on the website, the total number of pages, the number of inbound links and outbound links, the number of broken links, security features of the website, how many other sites reference the contents on the website, reputation of other websites that refer to this website, traffic data associated with the website, etc. For example, content of a website can include information about presence or absence of advertisements on the website, presence or absence of a provision to contact the owners of a website and/or leave comments/feedback (e.g., email, "contact us" page), and any other information indicative of the overall status of the website. In some embodiments, data associated with the webserver that is associated with a website may be used. Such webserver data may include data related to the location, ownership, IP address, and information about the various types of applications running on that webserver. In some embodiments, presence or absence of a mailserver application may be used as one of the inputs for determining the likelihood of renewal. In certain other embodiments, the quality of links on a particular website can be determined. For example, if there are numerous other websites that link to a particular website, it may be an indication that the website is popular and hence the domain name associated with the website may have a high probability of renewal. Thus, a ratio of inbound links to outbound links may be an important factor in determining a website's operational status and the associated domain name's renewal probability.

Traffic data for a website can be derived from several different sources, e.g., from the Internet Service Provider (ISP) that hosts the domain name, the registry that resolves the TLD for the website, etc. In addition, the traffic data can include different information. For example, DNS traffic data will include information that is different from any other traffic data. In some embodiments, the traffic data may be additionally classified into inbound traffic data and outbound traffic data. Inbound traffic data can include e.g., number of visitors to the website who visit the various pages of the website. Outbound traffic can include, e.g., redirections to other websites. In some embodiments, a ratio of inbound to outbound traffic can be determined and used in the probability calculations. In some embodiments, domain lookup statistics can also provide useful information about the status of a website.

For example, by determining the number of times a particular domain name is resolved may provide an indication of the popularity of that website. In other embodiments, queries regarding availability of a certain domain name may provide an indication about the desirability of that domain name. The domain lookup statistics can be one of the categories used to determined likelihood of renewal. In some embodiments, traffic data obtained from third parties e.g., ISP can also be used as an indication of the popularity of a website.

It is to be noted that the type and sources of domain related data not specifically mentioned herein but which can be logically extrapolated based on the disclosure, are not outside the realm of this disclosure.

Figure 2:
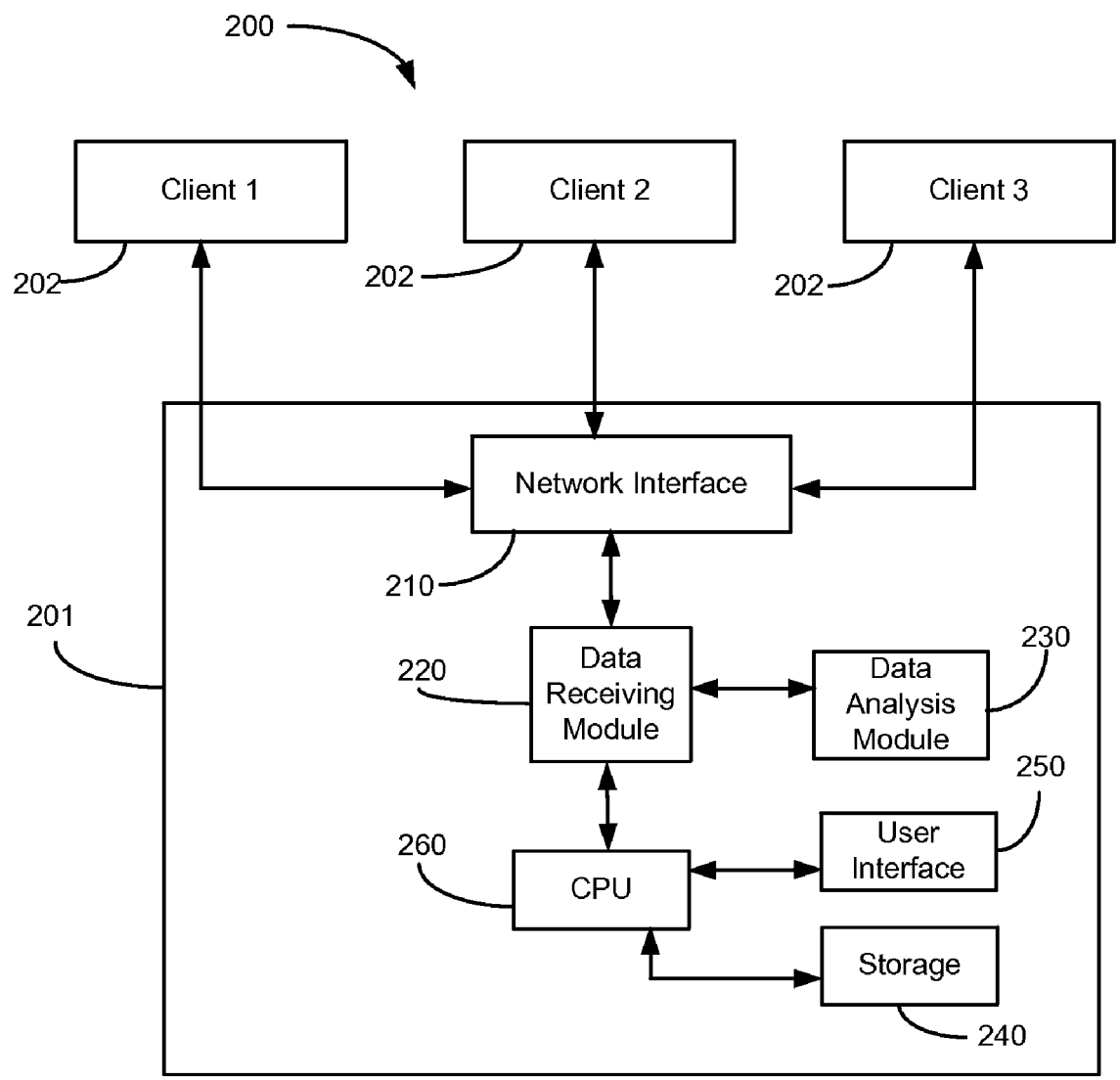
FIG. 2 is a block diagram of a system including a plurality of client servers and a prediction unit for calculating probability of domain name registration renewal according to an embodiment of the present invention.

FIG. 2 is block diagram of a system 200 illustrating prediction unit 201 and one or more clients 202. In an embodiment, prediction unit 201 can operate as part of a registry. In some embodiments, clients 202 can be webservers that can host a website associated with a particular domain name, e.g., www.example.com. Clients 202 can be any conventional server that has the functional capabilities to host a website, perform nameserver transactions, perform domain name provisioning services, or perform domain name resolution services, and communicate with other servers over a network.

Prediction unit 201 can include network interface module 210 to enable communication with one or more clients 202. Network interface module 210 can be coupled to data receiving module 220. Network interface module 210 can allow prediction unit 201 to communicate with various other network-enabled devices. For example, network interface module 210 might support connections to one or more external servers that host websites associated with domain names. Network interface module 210 can communicate with other devices and servers on the network using either a wired connection or a wireless connection.

Data receiving module 220 can receive data provided by clients 201. Data receiving module 220 can derive attributes/characteristics about a web site accessible through the domain name, based on the received data. For example, data receiving module 220 can derive several different types of attributes related to the website such as DNS traffic data, total number of pages on the website, data related to frequency of information update on the website, etc. Each of these data attributes can include multiple data items that define the attribute. In addition, data receiving module 220 can also receive data from external sources (not shown) other than clients 202. In an embodiment, data receiving module 220 can receive information from a registration server (not shown) that can include registration information about a domain name, e.g., length of registration, number of consecutive renewals, etc.

Data analysis module 230 can receive data from data receiving module 220 and organize the incoming data into various categories. As described above, various types of data can be received by data receiving module 220. This data can be organized so that it can be used in further calculations. Data analysis module 230 can analyze the received data and organize the data into one or more predetermined categories. In some embodiments, the categories can be dynamically made available based on received data. For example, categories made available for organizing data collected from a Fortune 500 Company website can be different from the categories made available for organizing data collected from a traffic monetization site. In addition, categories made available for organizing data collected from a particular domain name may not represent all the available categories. Thus, categories made available for organizing data associated with a particular domain name may be a subset of the total number of categories available. In some embodiments, data analysis module 230 can assign a weighted value to each of the categories. A weighted value represents the relative influence of a particular category on the registration renewal probability of that domain name. The weighted value can depend on the historical performance of the category and its influence on the domain name registration renewal, as described above. In some embodiments, the weighted values are predefined and static. In other embodiments, the weighted values can be evaluated periodically and may be adjusted based on the historical influence of that category on registration renewal prediction. For example, initially the continuity of registration category may be given a lower weighted value. This weighted value may be adjusted to a higher number if it is determined that the continuity of registration plays a major role in registration renewal, e.g., domain names that have continuously renewed for five years or domain names whose previous renewal term durations have been greater than one year are more likely to renew than the ones that have a shorter continuity of renewal.

Figure 3:
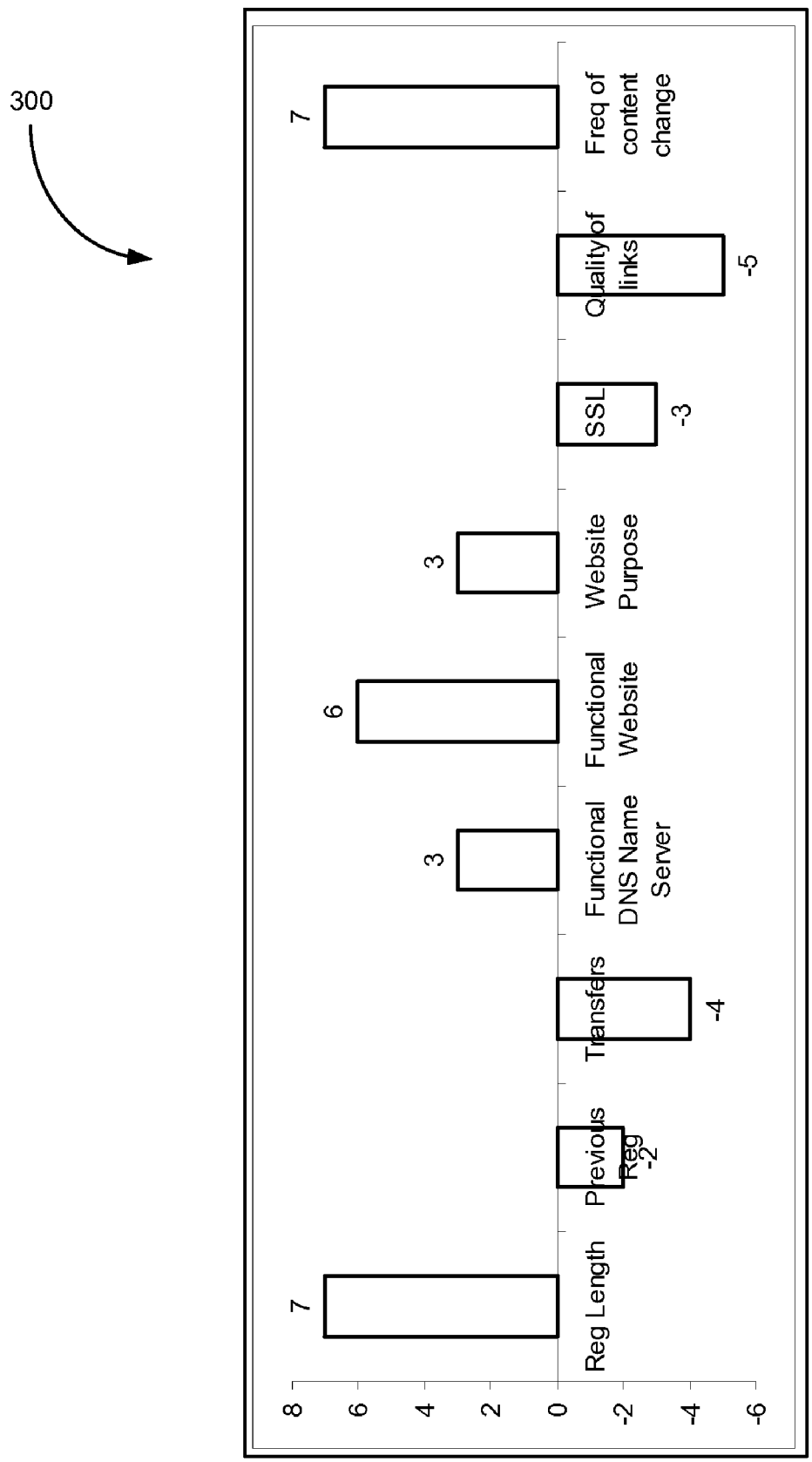
FIG. 3 is a graphical representation of the various categories and their associated weighted values that can be used to predict domain name registration renewal according to an embodiment of the present invention.
Figure 5:
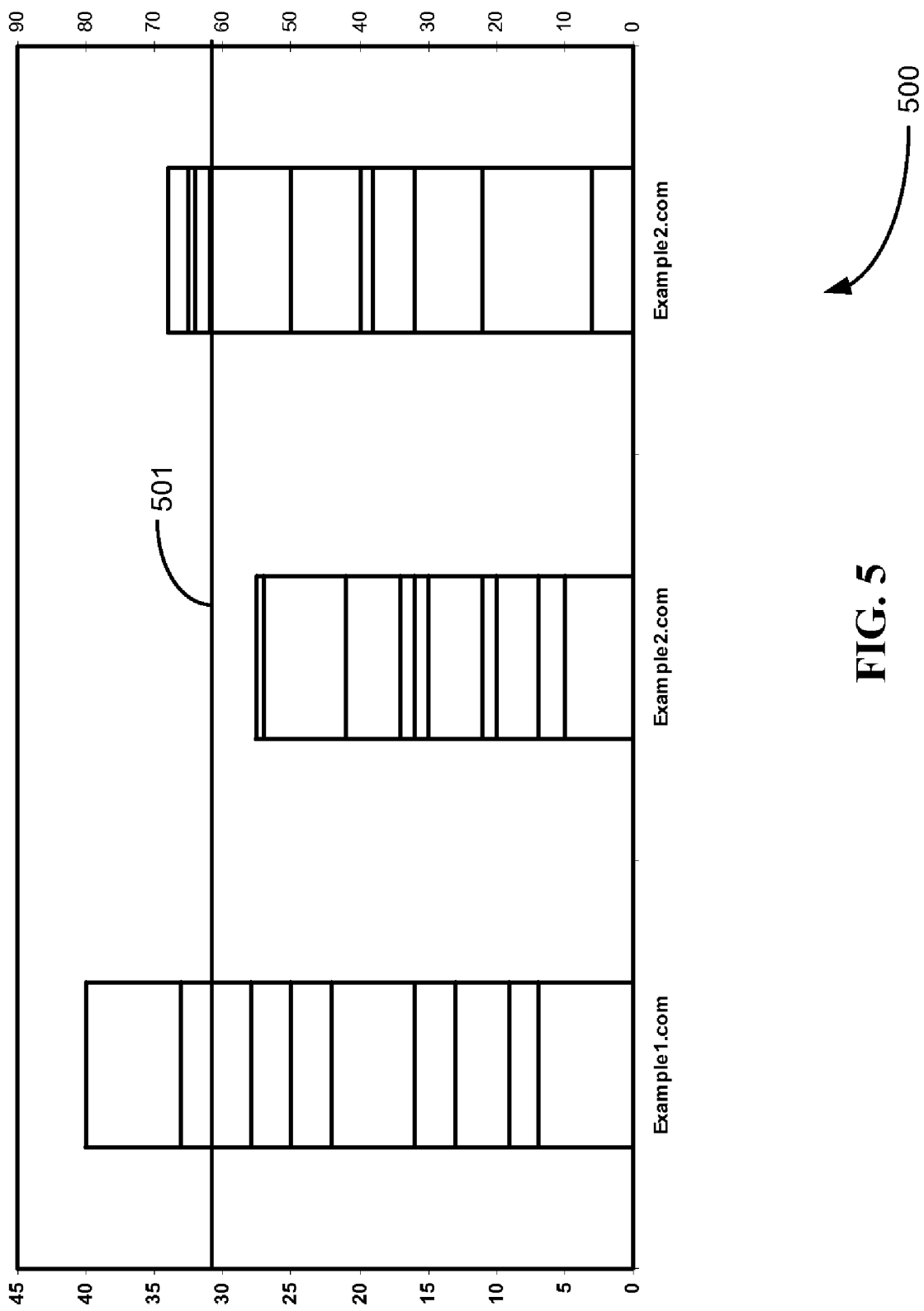
FIG. 5 is a graphic representing probability of registration renewal of various sample domain names according to an embodiment of the present invention.

In some embodiments, the data analysis module 230 can be implemented as an integrated module capable of performing all the different functions described above. In other embodiments, each of the functions of organizing the data in predetermined categories, assigning a weighted value to each category, and aggregating the weighted values across all categories can be performed by separate modules. In yet other embodiments, one or more of the functions can be combined into multiple modules. FIG. 3 is graphical representation 300 illustrating some of the categories that can be included in calculating a probability of registration renewal. As illustrated, each category can have a weighted value associated with it. As described below, an aggregated weighted value is calculated as part of the process for determining the probability of renewal of a domain name registration. FIG. 5 shows chart 500 illustrating aggregated weighted values of several domains as they relate to probability of renewal of the individual domain names.

Storage device 240 can be implemented, e.g., using disk, flash memory, or any other non-volatile storage medium. In some embodiments, storage device 240 can store the historical information, discussed below, for all the domain names. In some embodiments, storage device 240 can also store all the attributes/categories along with their respective weighted values. Storage device 240 can also store other information like program instructions for performing the probability calculation, a list of all domain names for which the probability is to be calculated, etc.

User interface 250 can include input controls such as a touch pad, touch screen, button, keypad, keyboard, microphone, or the like, as well as output devices such as video screen, indicator lights, speakers or the like, together with supporting electronics (e.g., digital-to-analog or analog-to-digital converters, signal processors or the like). User interface 250 can display the probability information for one or more domain names. In some embodiments, user interface 250 can display the expected revenue information across all domain names being monitored. User interface 250 can also be capable of accepting user input via the input controls. For example, a user can provide registration information of a particular domain or indicate which domain names are to be used in the revenue calculations.

CPU 260, which can be implemented as one or more integrated circuits (e.g., a conventional microprocessor or microcontroller), can control the operation of prediction unit 201. For example, in response to user input signals provided by user interface 250, CPU 260 can calculate probability of registration renewal of a particular domain name. In some embodiments, CPU 260 can also control user interface 250 to provide interfaces allowing a user to input registration information about domain names, as described above. In some embodiments, CPU 260 can retrieve program instructions stored in storage device 240 and execute the program to instruct data analysis module 230 to perform certain functions.

Prediction unit 201 may be a user computer system, wireless communication device, a server, or any other network-capable device with the requisite functional capabilities. Prediction unit 201 may operate as part of, or separate from, a data collection server associated with a registry.

Further, while prediction unit 201 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

It will be appreciated that the system configurations and components described herein are illustrative and that variations and modifications are possible. The client server and/or prediction unit can have other capabilities not specifically described herein.

Figure 4:
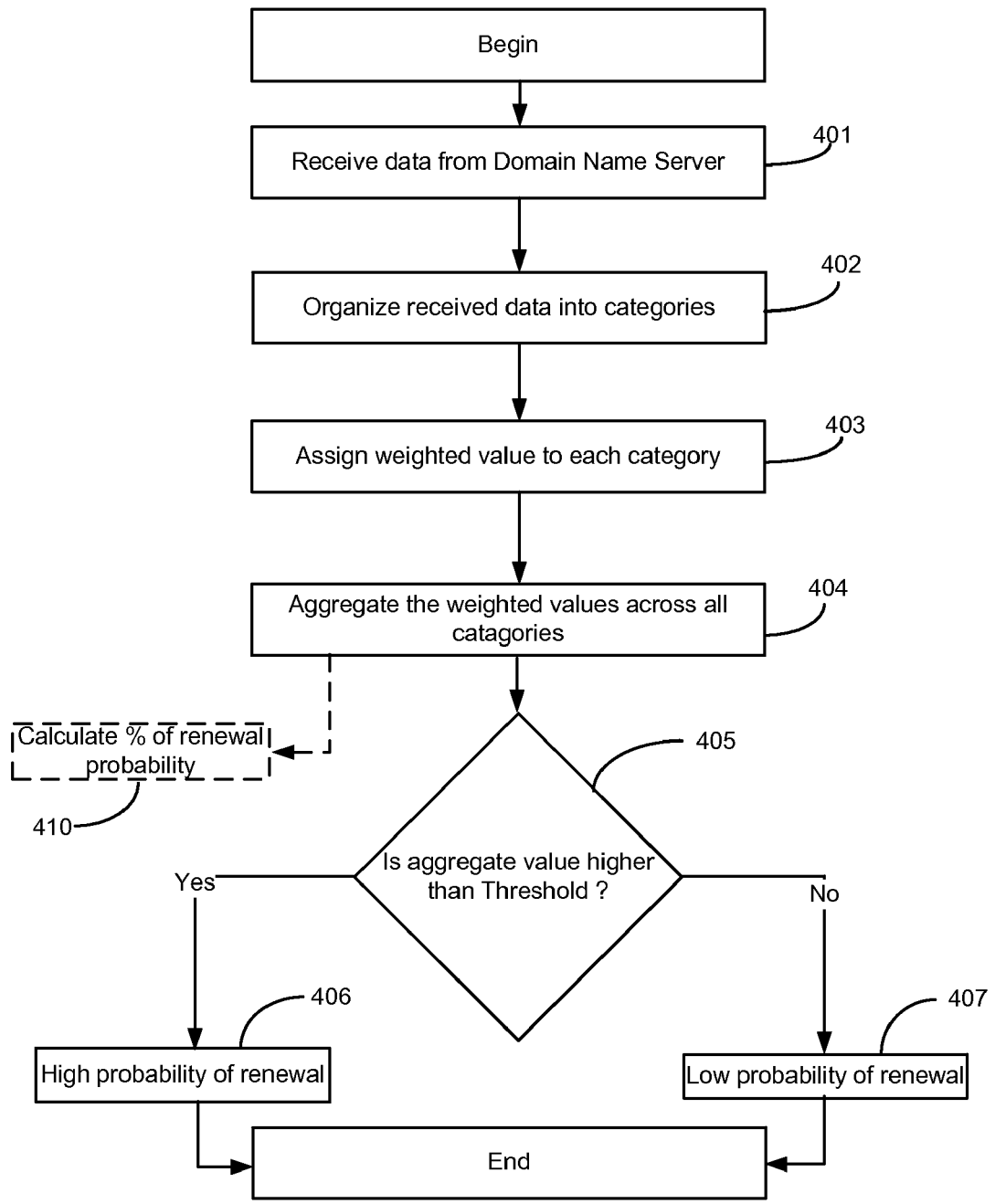
FIG. 4 is a simplified flowchart illustrating a process for predicting a domain name registration renewal probability according to an embodiment of the present invention.

FIG. 4 is a simplified flowchart illustrating a process 400 for determining the probability that a domain name registration will be renewed according to an embodiment of the present invention. Process 400 can be performed, e.g., by prediction unit 201 of FIG. 2. At step 401, the prediction unit can receive domain related data from the client servers. As described above, the domain related data can include historical and non-website data about the domain in addition to data related to a website associated with the domain. An example of a client server is a domain name server.

In step 402, the received data can be analyzed to determine the type/attribute of the data. The data can be organized into one or more categories. As discussed earlier, in some embodiments, the categories can be predetermined. In other embodiments, the categories may be associated with the type of website/domain, e.g., whether the domain hosts a pay-per-click (PPC) site, or is associated with a Fortune 500 company. In some embodiments, the categories are evaluated and updated periodically. In some embodiments, new categories may be created to account for change in renewal behavior of the domain names.

At step 403, each of the categories can be assigned a weighted value. The weighted values are assigned as described above. It is to be noted that the weighted values for a particular category may change over time based on that category's relative influence on registration renewal.

At step 404, the weighted values of all the categories can be aggregated to calculate a combined weighted value for the domain. At step 405, this combined weighted value can be then compared to a threshold value at step 405. In some embodiments, the weighted values may be stored in storage 240, described above, to create a historical record of a domain. Such historical record can be useful in performing trend analysis of the domain name to determine certain aspects of the domain name.

If at step 405, it is determined that the aggregated weighted value of a domain is higher than the threshold value, the system can conclude, at step 406, that the particular domain name has a higher probability of renewal. On the other hand, if at step 405 it is determined that the aggregated weighted value is less than the threshold value, it may be concluded, at step 407, that the particular domain name has a low probability of renewal.

In some embodiments, the combined weighted value is used to calculate a percentage of renewal probability. This is illustrated in FIG. 4 using a 'dashed' arrow leading to block 410. In an embodiment, a combined weighted value may correspond to a percentage of renewal probability. For example, a combined weighted value of 5 may correspond to 10% probability of renewal and a weighted value of 40 may correlate to 80% probability of renewal. In some embodiments, the percentage of renewal probability can range between 0.01% to 99.9%.

It will be appreciated that process 400 described herein is illustrative and that variations and modifications are possible. Acts described as sequential can be executed in parallel, order of acts can be varied, and acts can be modified or combined. Chart 500, of FIG. 5, illustrates a sample result that can be generated after execution of process 400. As illustrated in FIG. 5, weighted values for each category of a domain name are aggregated to determine a combined/aggregated weighted value for each domain. This aggregated weighted value is compared against threshold value 501 to determine whether a particular domain name has a high or low probability of renewal. For example, in FIG. 5, www.Example1.com has an aggregated weighted value that is greater than threshold value 501. Hence, it can be concluded that Example1.com has a high probability of renewal. In contrast, www.Example2.com's aggregated weighted value is lower than threshold value 501 thus indicating that Example2.com may have a lower probability of renewal.

In some embodiments, a percentage of renewal probability may be determined based on the combined weighted value. For example, as illustrated in FIG. 5, a combined weighted value of about 40 may correspond to about 80% probability of renewal and a combined weighted value of about 27 may correspond to about 55% probability of renewal.

In some embodiments, the calculated probability information for multiple domains can be used to predict the revenue that can be generated from those domains. As described earlier, each domain name is subject to an annual subscription fee. So, for example, if there are 100 domain names that are due for renewal within the month of June 2009, the renewal probability information for all the domains can be can be calculated using process 400 described above. Based on the probability information, if for example, it is determined that 75 of the 100 domain names have a high probability of renewal, the system can predict a revenue amount that can be reasonably expected from the registration renewals for the month of June 2009. In some embodiments, the probability information can be calculated over an extended period to provide quarterly or yearly revenue forecast from the registration renewal fees for multiple registered domains. For example, FIG. 7 illustrates a sample revenue forecast table based at least in part on the registration renewal probability calculation discussed above.

Figure 6:
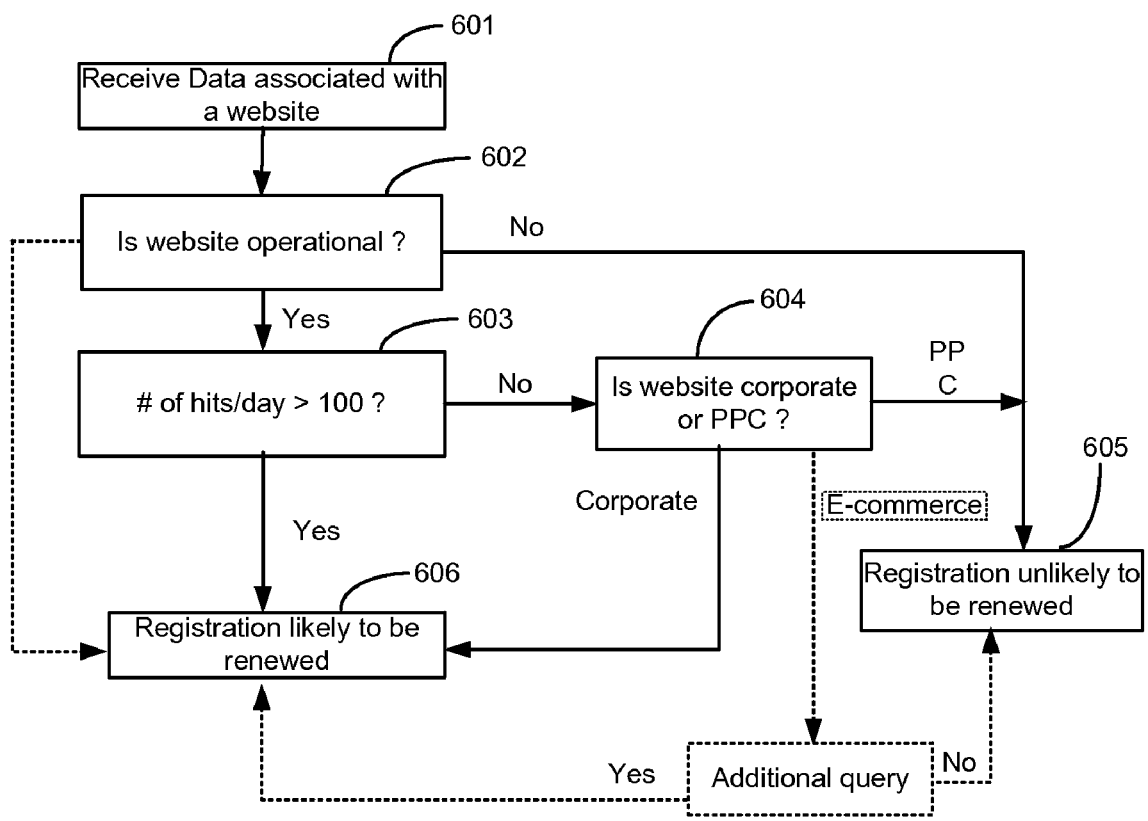
FIG. 6 is a simplified flowchart illustrating a process for determining a domain name registration renewal probability according to an embodiment of the present invention.

FIG. 6 is a simplified flowchart illustrating a process 600 for determining the probability that a domain name registration will be renewed according to another embodiment of the present invention. In this embodiment, the probability prediction is done using a 'decision tree' approach. In the decision tree approach, a series of queries are made for each website and a decision made regarding the probability of registration renewal based on the answer to each query. Answer to each query may either result in a decision being made or result in further queries. As illustrated in process 600, at step 601, the system receives data associated with a website. At step 602, the system can check whether the website is operational. If it is determined that the website is non-operational, then it may be concluded that the registration for that domain is unlikely to be renewed and the process may end at step 605.

If at step 602, it is determined that the website is operational, it may lead to further query at step 603. At step 603, the system can check the amount of traffic received by the website. For example, in some embodiments, the system can check whether the website receives more than 100 hits per day on a consistent basis. In this case, a negative answer may not necessarily result in a decision that the registration is unlikely to be renewed. Rather, a negative answer may lead to a further query about the type of website being evaluated, e.g., corporate, Pay-Per-Click (PPC), traffic monetization, ecommerce, etc., at step 604. The traffic data for the website may be gathered from any of the sources described previously. If at step 603, it is determined that the website receives more than 100 hits per day, it may be concluded that the website registration will renewed. In some embodiments, a positive answer may not necessarily be taken to conclude that registration will be renewed by may rather lead to a further query, e.g., ratio of number of inbound links to outbound links.

If at step 604, it is determined that the site does not pass the website traffic criteria of step 603, the type of website may be determined. For example, the system may check, based on the data gathered, whether the website is a corporate website, a PPC website, a traffic monetization website, etc. Based on the result of this investigation, the system may conclude either that the domain name registration renewal is unlikely or the answer may lead to further queries to determine other attributes for that website. For example, as illustrated in FIG. 6, at step 604, the system may check whether a particular website is of a Fortune 500 company (corporate) or a PPC site. If the website is a PPC website, then the system may conclude that a combination of PPC website and less than 100 clicks per day is an indication that the website is not popular and hence may not renew its domain registration. On the other hand, if it is determined at step 604 that the website is associated with a Fortune 500 company, then fewer than 100 hits per day may not necessarily be seen as an indication of risk of renewal. Instead, in such an instance, it may lead to a further query, e.g., length of registration, continuity of registration, etc. or the system may conclude that it is likely that the registration of the domain name will be renewed, at step 606.

It should be noted that the decision tree approach may result in various permutations and combinations of queries being made and answered. In some embodiments, the decision tree may be dynamically generated based on several factors, e.g., type of website, type of TLD (.com vs. other TLD), etc. In addition, answer to a particular query may not result in the same further query in all embodiments. For example, in one embodiment, answer to query A may result in query B being asked. In other embodiments, answer to query A may result in query G being presented. Thus, it should be noted that a sequence of queries may depend on multiple factors in addition to the initial query. In some embodiments, the queries may be created from one or more categories/attributes described above and may be derived from the various sources of data described above. Alternate paths in the decision tree are indicated by 'dashed' arrows and blocks in FIG. 6.

It will be appreciated that process 600 described herein is illustrative and that variations and modifications are possible. For instance, in an embodiment, process 600 may be a sequential sets of queries executed to reach a conclusion on whether a particular domain name registration is likely to renew or not. In other embodiments, process 600 may be complex with multiple branches of queries being performed sequentially or in parallel.

Table 700 illustrates revenue forecast for a particular month. Column 701 can display the list of domain names that are due for renewal in a future month, e.g., June 2010. Column 702 can display the registration expiration date for each of the listed domain names. Column 703 can display the results from the renewal probability calculations described above. Column 704 can display the amount of renewal fees for each domain. In some embodiments, the renewal fee may be same for all domains. In other embodiments, renewal fee may vary according to the type of domain. Column 705 can display the expected revenue amount from each of listed domain names. In some embodiments, the expected revenue can be the renewal fees multiplied by the probability of renewal. It is to be noted that actual revenue would either be equal to the renewal fees or zero. However, calculating expected revenue that corresponds to the renewal probability will result in a dependable result when averaged over a number of domains. For example, if there are 50 domains with a 60% probability of being renewed and renewal fee is $50/domain name and these domains are renewed for one year, then the expected revenue from the 50 domain names would be $1500 ([60%*$50]*1*50). Considering that only 30 domain names actually renew for one year, the actual revenue would be $1500 (30*1*$50). Thus, it can be seen that averaging the expected revenue over a large number of domain names may result in a revenue amount that is fairly close to the actual revenue generated. Total expected revenue for the month can be displayed in section 706. It is to be noted that table 700 is for illustrative purposes only. One skilled in the art will recognize that various other structures of the table are possible. Further, organization and content of data within the table is not limited to the one shown and various other modifications are possible.

It is to be noted that the expected revenue calculations shown above is merely for purposes of illustration and several other methods of calculating expected revenue are possible based on the accounting method used by a particular company. For instance, the above-mentioned method of determining the probability of renewal can be used to calculate the expected deferred revenue from each of the domain names. In some embodiments, expected deferred revenue can be calculated as follows. Consider that a domain name, XYZ.com, has a yearly renewal schedule that is due in June 2009 and the renewal fees are $12 per year. If it is determined that XYZ.com has a high probability of renewal, then in the deferred revenue calculation method the expected revenue from this domain is $1 for every month starting June 2009 and ending May 2010 even though the actual amount received is $12 (full renewal fees) in June 2009. This is sometimes referred to as realized revenue. Thus, it can be seen that the length of renewal may affect the amount of revenue realized every month. For example, expected revenue calculated for several domains that are on a different renewal schedule, e.g. 1 year, 2 year, etc. will be different for each domain name for a given month.

In some embodiments, it may be possible to calculate an average term length for a domain and calculate revenue for each domain based on the average term renewal length rather than determining the renewal term length of each individual domain. This may provide a more consistent revenue prediction and result in a simpler method for revenue calculation.

In some embodiments, the probability information gathered over a period of time can be used to identify a trend that can be used to identify domain names that may be at risk of being deregistered. Once identified, a company hosting such "at risk" domains can proactively work with the domain registrants to ascertain the risk factors and devise solutions to mitigate the risks in order to improve renewal rates of domains. For example, if a domain name shows consistently falling aggregated weighted values, even if the values are greater than the threshold value, over a number of years, it can be concluded that the domain is at risk of non-renewal during the next renewal cycle. Such trend analysis of registration renewal probability can be helpful in analyzing other aspects of a domain. For example, registration trend analysis of certain pay-per-click websites, based on the various categories described above may provide insight into the lifecycle of such sites.

In some embodiments, the probability information may be used to identify the categories that have minimal to no impact on the registration renewal of the domain names. The categories that are so identified may be either removed from future calculations of the probability of renewal or assigned a lower weighted value corresponding to their relative influence. This may increase the accuracy and efficiency of the prediction process. For example, if it is determined that number of pages on a website associated with a domain has minimal to no impact on its registration renewal, the system can be modified to ignore the "number of pages" category/attribute for future calculations of probability.

In some embodiments, new categories can be identified that can influence the registration renewal of a domain name. In some embodiments, it may be possible to identify a set of categories that are more influential for a particular type of domain. For example, a traffic monetization type of domain may have certain categories that are more influential than other categories for predicting renewal probability, while a domain name associated with a product-based company will likely have different categories that influence its renewal probability. Thus, information about purpose of a website can be used to identify categories that can provide better accuracy for registration renewal prediction.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A computer-implemented method for determining probability of a domain name registration renewal, the method comprising:
   receiving, by a computer system, a plurality of inputs associated with the domain name;
   assigning each of the plurality of inputs to at least one category from among a plurality of categories;
   assigning a weighted value to each of the plurality of categories; and
   calculating the probability of the domain name registration renewal based in part on the weighted value of each category, wherein calculating the probability includes:
      aggregating the weighted values for one or more of the plurality of categories; and
      calculating a percentage indicating the probability that the registration of the domain name will be renewed.

2. The method of claim 1 wherein the plurality of inputs include registration data, domain name system (DNS) nameserver data, website content data, and DNS traffic data.

3. The method of claim 2 wherein the registration data includes information related to continuity of registration of the domain name.

4. The method of claim 1 further comprising determining whether a website associated with the domain name is functional.

5. The method of claim 1 further comprising calculating an expected revenue amount based on the probability of the domain name registration renewal.

6. The method of claim 1 wherein assigning the weighted value includes:
   comparing each of the plurality of categories to historical data associated with each category; and
   assigning the weighted value to each of the plurality of categories based in part on the historical data for each category.

7. The method of claim 1 further comprising:
   identifying categories that do not affect the determination of the probability of renewal; and
   eliminating the identified categories from future determination of the probability of renewal.

8. The method of claim 1,
   wherein the plurality of inputs includes registration information, nameserver data for the domain name, domain lookup statistics for the domain name, information about a website hosted at the domain name, or a combination thereof; and
   wherein the plurality of categories includes at least one of a length of time the domain name has been registered, a number of continuous times the registration of the domain name has been renewed, a length of time the domain name has been registered without becoming unregistered, a status of a website hosted at the domain name, or a purpose of the website hosted at the domain name.

9. A computer-readable storage medium including instructions which when executed cause a processor to perform a method for determining probability of a domain name registration renewal, the method comprising:
   receiving, by a computer system, a plurality of inputs associated with the domain name;
   assigning each of the plurality of inputs to at least one category from among a plurality of categories;
   assigning a weighted value to each of the plurality of categories;
   calculating the probability of the domain name registration renewal in part on the weighted value of each category, wherein calculating a probability includes:
      aggregating the weighted values for one or more of the plurality of categories; and
      calculating a percentage indicating the probability that the registration of the domain name will be renewed.

10. The computer-readable medium of claim 9 wherein the plurality of inputs include registration data, domain name system (DNS) nameserver data, website content data, and DNS traffic data.

11. The computer-readable medium of claim 10 wherein the registration data includes information related to continuity of registration of the domain name.

12. The computer-readable medium of claim 9 wherein the method further comprises determining whether a website associated with the domain name is functional.

13. The computer-readable medium of claim 9 wherein the method further comprises calculating an expected revenue amount based on the probability of the domain name registration renewal.

14. The computer-readable medium of claim 9 wherein assigning the weighted value includes:
   comparing each of the plurality of categories to historical data associated with each category; and
   assigning the weighted value to each of the plurality of categories based in part on the historical data for each category.

15. The computer-readable medium of claim 9 wherein the method further comprises:
   identifying categories that do not affect the determination of the probability of renewal; and
   eliminating the identified categories from future determination of the probability of renewal.

16. The computer-readable medium of claim 9,
   wherein the plurality of inputs includes registration information, nameserver data for the domain name, domain lookup statistics for the domain name, information about a website hosted at the domain name, or a combination thereof; and
   wherein the plurality of categories includes at least one of a length of time the domain name has been registered, a number of continuous times the registration of the domain name has been renewed, a length of time the domain name has been registered without becoming unregistered, a status of a website hosted at the domain name, or a purpose of the website hosted at the domain name.

17. A system for determining a probability of renewal of a domain name registration, the system comprising:
   a processor;
   a storage media containing instructions, which when executed by the processor, perform a method comprising:
      receiving, by a computer system, a plurality of inputs associated with the domain name;
      assigning each of the plurality of inputs to at least one category from among a plurality of categories;
      assigning a weighted value to each of the plurality of categories;
      calculating the probability of the domain name registration renewal based in part on the weighted value of each category, wherein calculating a probability includes:
aggregating the weighted values for one or more of the plurality of categories; and
calculating a percentage indicating the probability that the registration of the domain name will be renewed.

18. The system of claim 17 wherein the plurality of inputs include registration data, domain name system (DNS) nameserver data, website content data, and DNS traffic data.

19. The system of claim 18 wherein the registration data includes information related to continuity of registration of the domain name.

20. The system of claim 17 wherein the method further comprises determining whether a website associated with the domain name is functional.

21. The system of claim 17 wherein the method further comprises calculating an expected revenue amount based on the probability of the domain name registration renewal.

22. The system of claim 17 wherein assigning the weighted value includes:
comparing each of the plurality of categories to historical data associated with each category; and
assigning the weighted value to each of the plurality of categories based in part on the historical data for each category.

23. The system of claim 17 wherein the method further comprises:
identifying categories that do not affect the determination of the probability of renewal; and
eliminating the identified categories from future determination of the probability of renewal.

24. The system of claim 17,
wherein the plurality of inputs includes registration information, nameserver data for the domain name, domain lookup statistics for the domain name, information about a website hosted at the domain name, or a combination thereof; and
wherein the plurality of categories includes at least one of a length of time the domain name has been registered, a number of continuous times the registration of the domain name has been renewed, a length of time the domain name has been registered without becoming unregistered, a status of a website hosted at the domain name, or a purpose of the website hosted at the domain name.

* * * * *